(12) United States Patent
Potter et al.

(10) Patent No.: US 6,708,258 B1
(45) Date of Patent: Mar. 16, 2004

(54) COMPUTER SYSTEM FOR ELIMINATING MEMORY READ-MODIFY-WRITE OPERATIONS DURING PACKET TRANSFERS

(75) Inventors: Kenneth H. Potter, Raleigh, NC (US); Trevor Garner, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 271 days.

(21) Appl. No.: 09/881,280

(22) Filed: Jun. 14, 2001

(51) Int. Cl.[7] ............................................... G06F 13/00
(52) U.S. Cl. ......................... 711/154; 711/155; 710/52
(58) Field of Search ................................ 711/155, 154, 711/156, 104, 105; 709/212, 216, 213; 710/52

(56) References Cited

U.S. PATENT DOCUMENTS

| | | | | |
|---|---|---|---|---|
| 4,914,573 A | * | 4/1990 | Scales, III et al. | 711/144 |
| 5,394,535 A | * | 2/1995 | Ohuchi | 711/155 |
| 5,488,691 A | * | 1/1996 | Fuoco et al. | 714/52 |
| 5,745,790 A | * | 4/1998 | Oskouy | 709/213 |
| 5,778,426 A | * | 7/1998 | DeKoning et al. | 711/122 |
| 5,974,514 A | * | 10/1999 | Andrewartha et al. | 711/166 |
| 6,026,090 A | * | 2/2000 | Benson et al. | 370/395 |
| 6,044,431 A | * | 3/2000 | Greenwood et al. | 711/5 |

* cited by examiner

*Primary Examiner*—Glenn Gossage
(74) *Attorney, Agent, or Firm*—Cesari and McKenna, LLP

(57) ABSTRACT

A computer system stores packet data and reduces the number of Read-Modify-Write (RMW) operations. An attribute is configured to specify a mode of operation that instructs the processor to perform a RMW operation, or to pad the packet data to over-write a memory line. A buffer defines the memory lines. Each memory line has a discrete number of bytes. The processor addresses the buffer with a memory address register. The attribute is a new bit in the memory address register. The attribute is configured to specify a mode of operation that instructs the processor to pad the packet data to be equal to one or more complete, full memory lines so that the padded packet data are stored only in complete, full memory lines, rather than to do an expensive RMW operation. The attribute may be a new bit added to the memory address register. A set value of the bit may indicate that a RMW operation is to be performed, and a clear value may indicate that padding of the packet data is to be done for the data to match the length of a memory line. When the data includes error correction code it is not necessary to perform a RMW, and the padding to fill a memory line is done.

26 Claims, 3 Drawing Sheets

COMPUTER SYSTEM FOR ELIMINATING MEMORY READ-MODIFY-WRITE OPERATIONS DURING PACKET TRANSFERS

FIELD OF THE INVENTION

This invention relates generally to nodes of computer networks and, more specifically, to improving the efficiency of storing packets in the nodes' computer memories by eliminating the need for additional read-modify-write (RMW) operations.

BACKGROUND OF THE INVENTION

A computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router or switch, to extend the effective "size" of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

Each node typically comprises a number of basic subsystems including a processor, a main memory and an input/output (I/O) subsystem. Data is transferred between the main memory ("system memory") and processor subsystem over a memory bus, and between the processor and I/O subsystems over a system bus. Examples of the system bus may include the conventional lightning data transport (or hyper transport) bus and the conventional peripheral component [computer] interconnect (PCI) bus. The processor subsystem may comprise a single-chip processor and system controller device that incorporates a set of functions including a system memory controller, support for one or more system buses and direct memory access (DMA) engines. In general, the single-chip device is designed for general-purpose use and is not heavily optimized for networking applications.

In a typical networking application developed using the single-chip device, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

For example, assume the system memory comprises double data rate (DDR) synchronous dynamic random access memory (SDRAM) devices and that a portion of the memory is organized into packet buffers at system initialization. These buffers are defined to start on certain binary boundaries (e.g., 32 bytes) in order to take advantage of the system bus burst size, bus alignment and cache line size. Assume also that the system (PCI) bus has a width of 32 (or 64) bits and system memory accessed over the bus is also 32 (or 64, respectively) bits wide thereby matching the bus. Moreover, each access (transfer) of data over the system bus to the memory comprises two cycles (or four half cycles). Therefore, at 32 (64) bits per half cycle, the minimum transfer size of packet data over the system bus is 16 (32) bytes (that is 4 bytes per half cycle times 4 half cycles equals 16 bytes).

Continuing the same example, in order to write 40 bytes of data to an address, e.g., 0x100038 in system memory, 10 half cycles are needed over a 32-bit (4 byte wide) system bus. However, to write 40 data bytes to system memory address 0x100037, 11 half cycles would be required (i.e., the first half cycle with 1 byte of data, 9 half cycles with 4 bytes and the last half cycle with 3 bytes). By aligning the buffer start address with the width of the system bus, efficient use of that bus is ensured. This same efficiency carries over to the actual system memory interface, where the data can be written into the system memory using the fewest cycles if the start of the buffer matches the granularity of accesses to the system memory. From a simplistic point of view with respect to the system memory, if a memory line is 32 bits or 4 bytes wide (herein a memory "line" includes the typical data storage word and any error correcting code extension to that word, if any), usually the entire line must be fetched in order to over write only one byte while preserving the other three bytes. So, in the above example [the system], to store the 40 bytes, the system will write to 10 full width lines when starting at address 0x100038 because the memory line width and the message length match 10 complete, full memory lines exactly. However, if the starting address is 0x100037, the first byte of the 40 will be stored in the last byte of a 4 byte wide first line, and the last three bytes of the 40 being stored will be stored in the first three bytes of the 4 byte wide eleventh line. Now if the last three bytes were modified, the entire four bytes must be fetched and the first three bytes modified while keeping the last byte intact (assuming it is part of another message, etc.); that is, a read-modify-write (RMW) operation must be used for changing the last three bytes. A similar operation must be used to modify the first byte of the stored 40-byte message. In this case the inefficiencies of the non-aligned memory are seen in the need to access eleven, rather than ten bytes, and the need for read/modify/write operations, rather than simple write operations.

The present invention becomes even more important for large packet memories incorporating error correction codes (ECC). In these memories, it is not feasible to provide byte-write capability since the ECC covers the entire widths of the memories. For example, assume the system memory, including a system memory bus interface, is arranged to accommodate a 64-bit memory "line" width. Eight (8) additional bits are needed for ECC computation by the system memory controller such that the memory and memory bus interface are organized and aligned on 72-bit line widths. Therefore, a non-aligned start address not only could cause an extra write cycle but also the inefficient RMW operation discussed herein.

By starting the packet buffers on appropriate binary boundaries, the inefficiencies of writing packet data to the beginning of the buffers are avoided. However, there is no equivalent "work around" in conventional systems when writing the end of the packet buffers in system memory. For example, if the effective memory width is 8 bytes and the length of a packet is 63 bytes, the last transfer of the packet over the system bus requires that only 7 bytes be written to the appropriate packet buffer. As noted, the processor and system controller device is general-purpose and, accordingly, does not "know" that the portion of memory is reserved solely for packet buffers. Therefore, the processor and system controller device strictly interpret the system bus operation using a RMW operation to preserve the one byte location of the buffer that was not written with the packet data, rather than "padding out" (e.g., writing null values) to that location. This represents an inefficient use of system resources and the present invention is directed to a technique that improves the efficiency of such resources As noted, the RMW operation is quite expensive and consumes substantial over-head with respect to "turning around" the memory bus when writing data into an allocated buffer. That is, not only does the RMW operation double the traffic over the memory bus (by both reading and writing the data block), it also consumes overhead with respect to gaining access/ownership of the memory bus in order to avoid collisions over that bus. Therefore, not only is the operation expensive in terms of resource consumption, but it also adversely (and substantially) impacts throughput over the bus. Accordingly, the present invention is directed to improving the efficiency of memory write operations to buffers within a packet memory of an intermediate network node.

SUMMARY OF THE INVENTION

The present invention comprises a mechanism for instructing a memory controller with respect to the performance of a write operation directed to a system memory of an intermediate network node. The memory controller is preferably embodied within a single-chip processor and system controller device having bus interface logic coupled to a system bus of the node. The bus interface logic includes conventional base address registers configured to decode addresses from system bus requests initiated by a media access control (MAC) controller coupled to a system bus. The base address registers are then used to determine those resources (e.g., lines of the system memory) targeted by the requests, such as the write operation.

According to the present invention, the mechanism comprises a novel attribute, e.g., a bit, added to each base address register. Depending upon an application executing on the processor, the attribute bit may be configured to one of two states, each of which specifies a mode of operation. In a first state, the bit may be configured to indicate that a partial write operation to a memory line within the system memory should be enforced exactly as specified by the system bus request, thereby resulting in a read-modified-write (RMW) operation described before. Alternatively, a second state of the bit may be configured to indicate that the partial write data be "padded out" to thereby overwrite, e.g., the entire memory line.

For example, assume the MAC controller issues a 7-byte write operation to the memory controller that is directed to an address 0x100030 in the system memory. If the bit is configured to specify overwriting of the memory line, the memory controller pads the data by one additional byte (at the end of the data), computes an error correction code for the entire 8 bytes and issues a single direct write operation to the 8-byte wide memory line. Similarly, assume the MAC controller issues a 6-byte external bus (write) request to the memory controller that is directed to address 0x100032. If the attribute is configured to specify overwriting of the memory line, the memory controller pads the data by 2 additional bytes starting at address 0x100030 (at the beginning of the data), computes an error correction code for the entire 8 bytes and issues a direct write operation to the 8-byte wide memory line. Although these operations destroy the previous contents of the byte at address 0x100037 (and of the bytes at addresses 0x100030–0x100031) within the packet buffer, the application did not intend to use those bytes anyway. The tradeoff is between using more memory than needed to store messages, as in the present invention, but providing the advantage of not requiring RMW operations.

In certain cases, it may be desirable to allow a particular memory region (buffer) to be operated on in both modes. Here, the MAC controller may pad out a system bus request to fill a packet buffer with original packet data to thereby avoid a RMW operation. However, the application executing on the processor may require manipulation of a packet header and, thus, not want to destroy any packet data. To accomplish these objectives, the memory can be "dual-mapped" to a virtual address space using two sets of base address registers. Both sets of registers may reference the same memory address, but one set has the novel bit configured in the first state and the other has the novel bit configured in the second state. Alternatively, the novel bit can come directly from a high order bit of the address specified in the write operation. As a result, the present invention advantageously increases the efficiency of writing packet data to system memory, particularly for small packet sizes.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
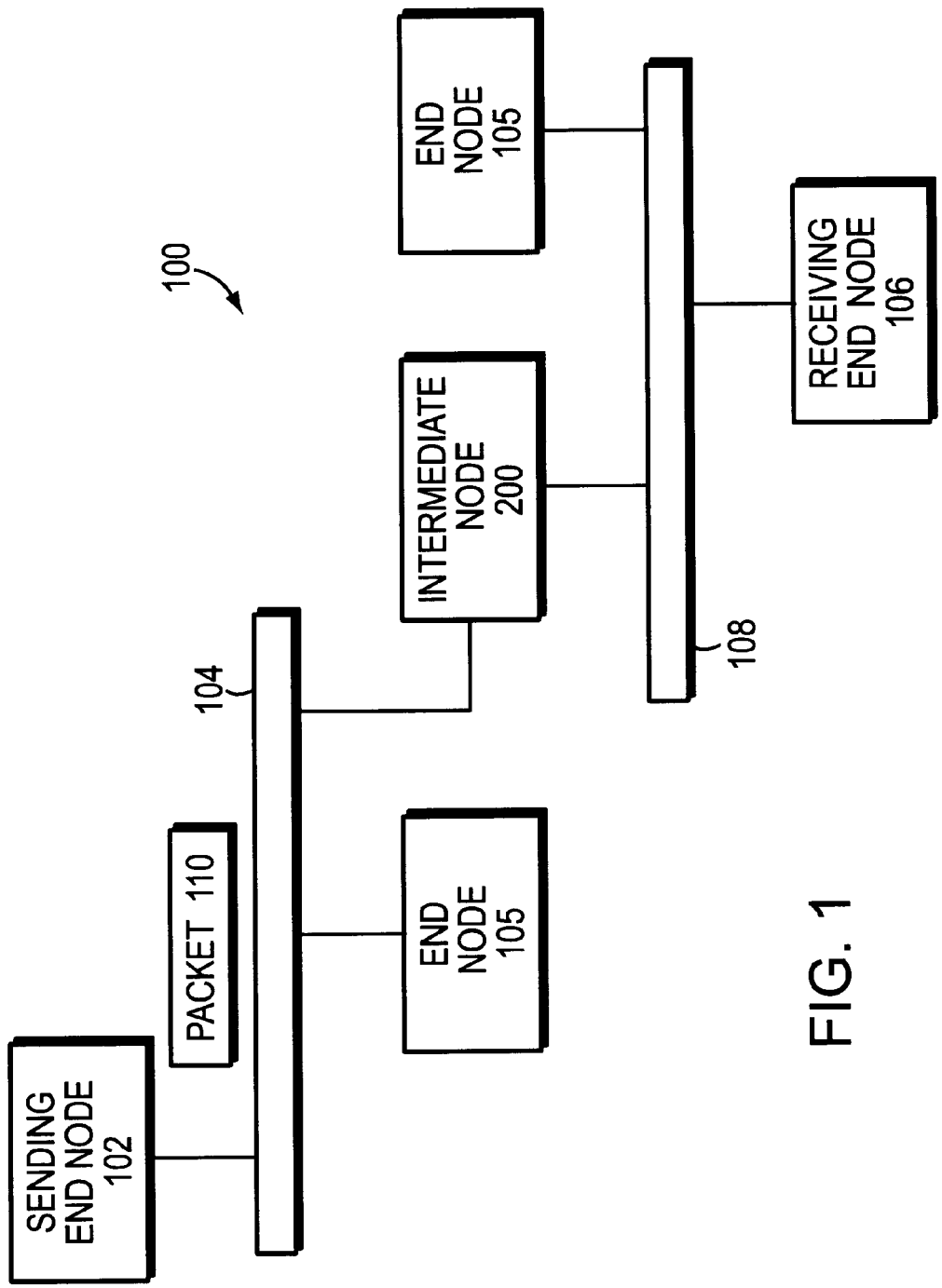
FIG. 1 is a block diagram of a computer network comprising a collection of inter-connected subnetworks and nodes, including an intermediate network node.

FIG. 1 is a block diagram of a computer network 100 comprising a collection of interconnected subnetworks and nodes. The nodes may comprise computers including end nodes 105, such as a sending end node 102 and a receiving end node 106, and an intermediate network node 200, the latter of which may be a switch or router. The subnetworks 104, 108 included within network 100 are preferably local area networks (LANs) interconnected by the intermediate node 200, although the networks may comprise other communication links, such as wide area networks. Communication among the nodes coupled to the LANs is typically effected by exchanging discrete packets 110 among the nodes.

For example, the sending node 102 generates a data packet 110 by encapsulating "payload" data within headers, such as conventional data link and network layer headers, as the data passes through different layers of a protocol stack. The packet is then transmitted over the network to the intermediate node 200, which facilitates the flow of the data packet through the network by routing it to the proper receiving node 106. Specifically, the node 200 receives the packet from an input interface, parses the data link and network layer headers, renders a forwarding decision for the packet, appends a new data link header to the packet and then transmits the packet to an output interface.

The present invention is directed to efficiently moving packet data from interfaces of a node to a system memory coupled to a processor subsystem of the node. Although the present invention is described herein using an illustrative intermediate network node, it will be apparent to those skilled in the art that the invention may apply to any node, including an end node. General-purpose processor subsystems are typically not optimized for networking application environments. The invention adds functionality to a general-purpose processor subsystem that increases the efficiency of the node when executing network applications. The general-purpose processor subsystem is typically configured to perform more than just networking applications, i.e., more than "pushing" packets in and out of system memory. Consequently, when the general-purpose processor subsystem performs such networking applications, the performance of the node may suffer.

Figure 2:
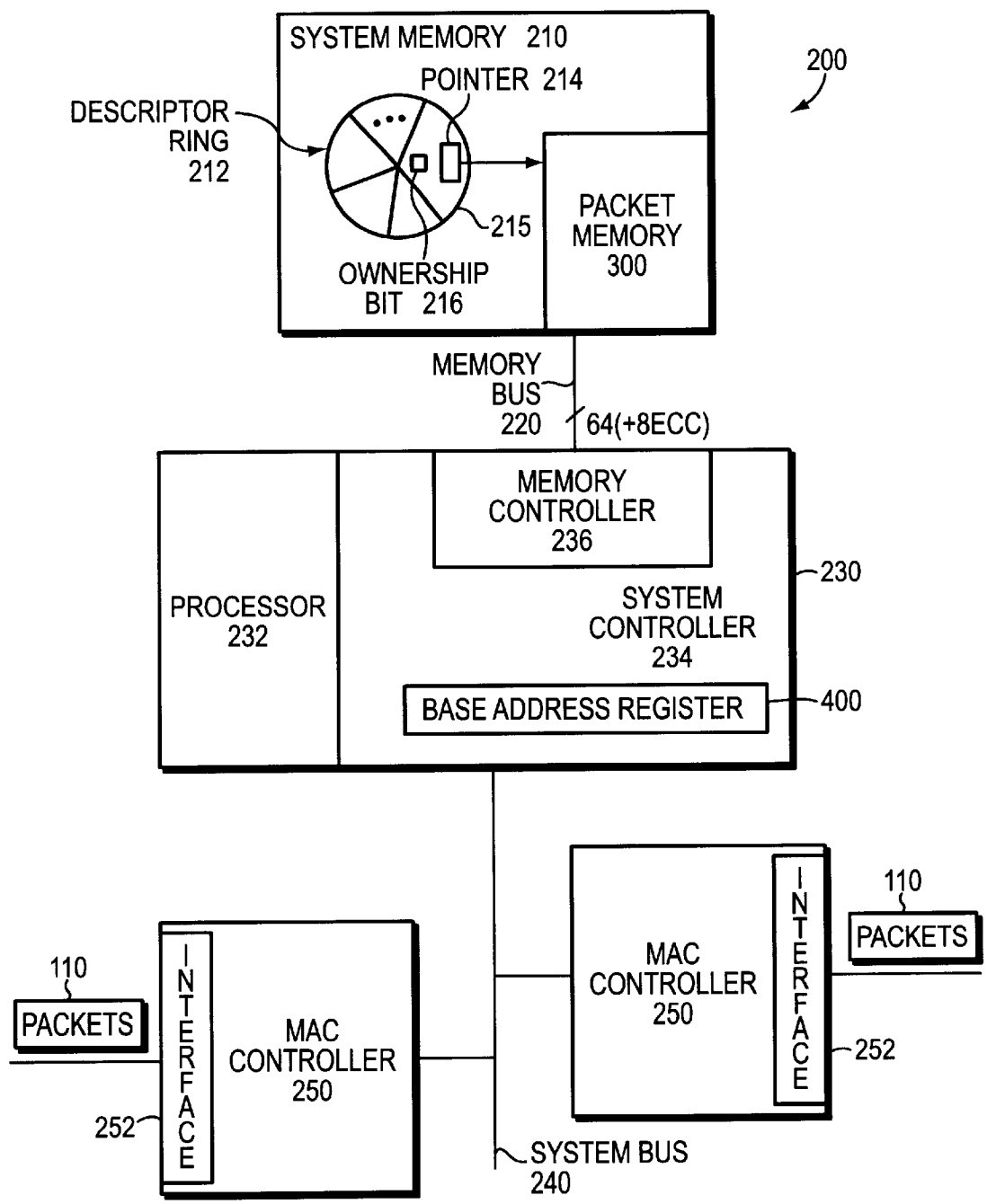
FIG. 2 is a schematic block diagram of an illustrative intermediate network node having a packet memory that may be advantageously used with the present invention.

FIG. 2 is a schematic block diagram illustrating an intermediate network node 200 that may be advantageously used with the present invention. The intermediate network node comprises a main memory subsystem ("system memory 210") coupled to a processor subsystem 230. In the illustrative embodiment, the processor subsystem 230 comprises a processor 232 and system controller 234 integrated onto a single "chip" device. The single-chip device further includes a memory controller 236 coupled to the system memory 210 via a memory bus 220.

The system controller 234 is connected to a system bus 240, such as the conventional peripheral component [computer] interconnect (PCI) bus which, in turn, [couples] to communication devices, such as media access control (MAC) controllers 250. Examples of the MAC controllers include Ethernet, High level Data Link Control (HLDC) or other similar communications controllers, known in the art, that are adapted to transmit and receive packet data to and from computer networks. For example, packet data may be received at a physical interface 252 of the controller that is attached to a computer subnetwork 104 in FIG. 1. The controller then moves that received data over the system bus 240 to the memory controller 236, where the data is forwarded over the memory bus 220 and onto a portion of the system memory 210 organized as a packet memory 300.

The system memory 210 comprises storage locations addressable by the processor for storing software programs and data structures associated with the invention described herein. An operating system, portions of which are typically resident in memory and executed by the processors, functionally organizes the intermediate node by, inter alia [inter alia,] invoking network operations in support of software processes executing on the node. It will be apparent to those skilled in the art that other memory means, including various computer readable media, may be used for storing and executing program instructions pertaining to the described mechanism and technique.

Figure 3:
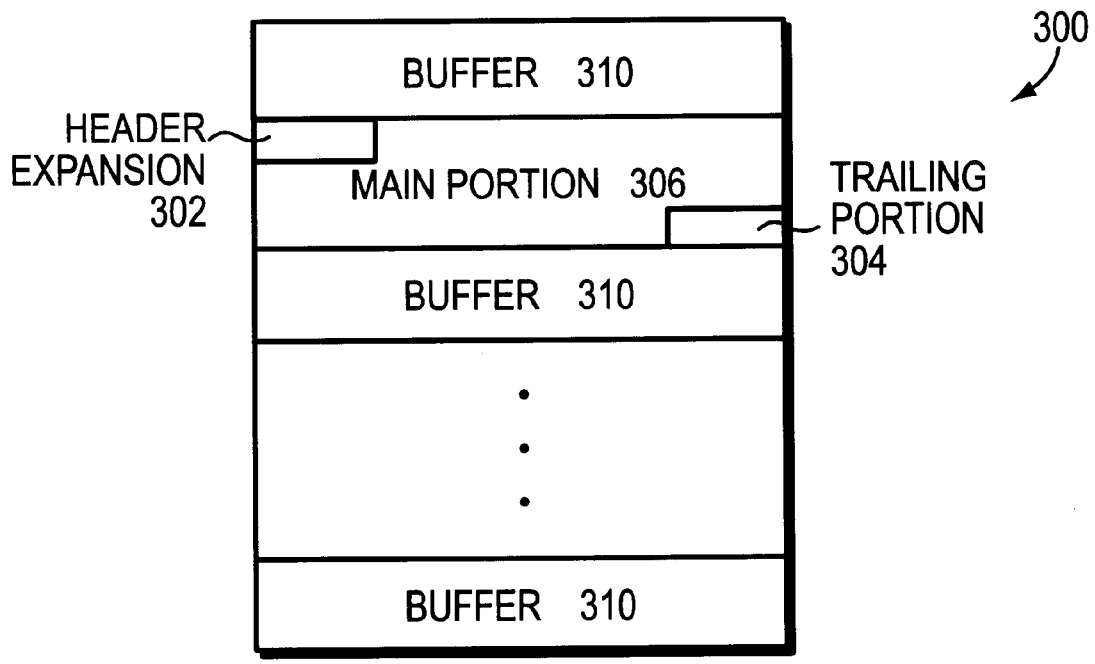
FIG. 3 is a schematic block diagram illustrating the organization of the packet memory.

FIG. 3 is a schematic block diagram illustrating the organization of the packet memory 300. The packet memory may be apportioned into a plurality of fixed sized buffers 310, e.g., 512-byte packet buffers. These fixed sized buffers are generally aligned on binary boundaries (e.g., 32-bytes) in order to take advantage of burst sizes over the system and memory buses, bus alignments and, e.g., cache lines. It should be noted, however, that the size of the buffers may be arranged to accommodate [, e.g.,] a worst-case packet size.

Often, a beginning portion of the buffer is reserved as a "header expansion" portion 302 in the event additional information may be added to the packet data moved into that buffer 310. For example, software executing on the processor processes the packet data by, e.g., removing an original header associated with the packet and inserting a new modified header onto the packet. In the event the new modified header expands ("grows") with respect to the original header, the header expansion portion 302 of the buffer is available to accommodate the expanded packet header. Another example of the use of the header expansion portion 302 that applies to an end node is for packet header decompression, which causes the header to grow. Thus, when a packet initially arrives at the buffer 310 of the packet memory 300, the packet is loaded ("written") into a main portion 306 of the buffer adjacent to the header expansion portion 302. The size of the buffer portion 302 is usually determined by the processor subsystem; however, if that size is not aligned on a binary boundary, then performance issues may arise as discussed herein.

In the illustrative embodiment, the memory bus 220 coupling the memory controller 236 to the packet memory 300 is preferably a 64-bit data bus that provides a standard memory interface width. For every 64-bits of data presented over this interface, an 8-bit error correction code (ECC) is computed by the memory controller and stored with the data. Therefore, the (buffer) memory is typically organized into 72-bit wide memory "lines." If it is desired to modify only a portion of a memory line data, a read-modify-write (RMW) operation must be executed. Broadly stated, execution of the RMW operation results in (i) retrieving (reading) the entire memory line data, (ii) modifying the portion of the data, (iii) computing a new ECC value for the entire modified data and (iv) storing (writing) the modified data back into the memory line.

Instead of accessing a single memory line in the packet memory 300, the subsystems are typically configured to enable access: to multiple lines within the memory. For example)to efficiently operate a memory controller, data is transferred over the memory bus in multiple cycle "bursts." Bursts are memory cycles that are used exclusively to write data to or read data from a number of usually contiguous memory locations without allowing other processes to access the memory at all. This is particularly true for double data rate (DDR) synchronous dynamic random access memory (SDRAM) devices, where transfers (accesses) of data to and from these devices generally comprise 2 cycles (or 4 half cycles). That is, data is accessed at the memory devices on both the rising and trailing edges of a clock signal. Therefore 4 half cycles, each comprising 64 bits, result in a 32-byte burst transfer over the memory interface. (Note that each half-cycle transfer of data includes an 8-bit ECC such that, for a 64-bit memory interface data path, a 72-bit wide interface is required.) Accordingly, a general-purpose packet controller is typically configured with a minimum transfer size of 32 bytes.

As noted, the RMW operation may be used to modify only a portion (e.g., a 64-bit or 8-byte portion) of the 32-byte burst. Yet, the RMW operation is expensive in terms of the resources, e.g., time and memory bandwidth, needed to execute that operation. Therefore, it is generally desirable to avoid performing byte-oriented operations on packet data. However, when a MAC controller "pushes" packets received at its physical interface to an allocated buffer in the packet memory, the memory controller may need to utilize a RMW operation. For example, if the header expansion portion 302 at the beginning of the buffer 310 does not end on a 32-byte boundary, the beginning of the main portion 306 of the buffer will reside in the same 32-byte area as the end of the header expansion portion. As a result, the memory controller must read the 32-byte "block," modify the portion where the packet is to be written, and then write the modified block back into the buffer.

Since the header expansion portion of the buffer does not yet contain any useful information, this represents an unnecessary use of the expensive RMW operation. To alleviate this situation, most subsystems allocate the main portion to an aligned (e.g., 32-byte) boundary in memory. However, this approach cannot be applied to the end of the packet transfer, primarily because the memory controller is part of a general-purpose processor subsystem. That is, in response to a request to write only a beginning portion of a 32-byte block to complete the packet transfer, the controller strictly interprets the request and performs a RMW operation, even though the remaining trailing portion 304 of the buffer is currently unused and does not contain any useful information that needs to be preserved.

Figure 4:
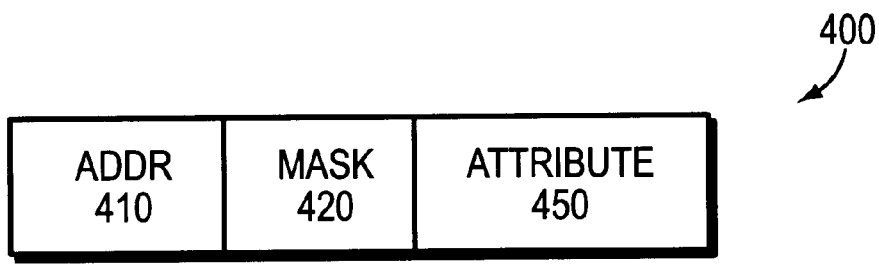
FIG. 4 is an illustration of the format of a base address register including a novel attribute in accordance with the present invention.

FIG. 4 is an illustration of the format of a base address register 400, including an attribute portion, often one bit in size. Each base address register 400 includes an address field 410 and a mask field 420 that cooperate to specify the defined address range. For example, if the address is "1EA000" and the mask is "FFF0000", then the defined address range is anywhere between address 1EA0000 and 1EAFFFF. This defined address range is the area of the packet memory that is decoded by the registers. The base address register provides an offset or base address that is enabled by the mask. The lower order bits of the physical packet memory being addressed are appended to the base address. This and other equivalent operations and manipulations using base addresses and/or masks servicing as offsets to specific memory addresses are well known in the art. The present invention adds a field to the base address register containing the novel attribute 450 that is configurable by the processor. The attribute 450 represents the status information that specifies whether the RMW operation is enforced on the specified address range that, in the illustrative embodiment, is essentially the packet memory portion of system memory "carved out" with the allocated buffers. Within that specified address range of allocated buffers, the processor may configure the attribute to a state that indicates, e.g., "no RMW."

In the illustrative embodiment, there is a plurality of base address registers that specify different address ranges, wherein each register may specify a different attribute state. The base address register maps an address as viewed on the system bus into an address within the system (packet) memory. Whereas one base address register may specify an address range with the attribute asserted to indicate "no RMW," another base address register may specify an address range with the attribute de-asserted to "enable RMW" operations to that range. Therefore, the novel attribute 450 may be configured to a first state denoting that a partial write operation to a memory line within a specified address range should be enforced exactly as specified by a bus request from a MAC controller, thereby resulting in the RMW operation. Alternatively, the attribute may be configured to a second state to denote that partial write data may be "padded out" to thereby overwrite, e.g., the entire memory line. This aspect of the inventive mechanism provides control by the processor over the mode of operation issued by the memory controller to the packet memory.

For example, assume the MAC controller issues a 7-byte external bus request (e.g., a write operation) to the memory controller that is directed to an address 0x00030 in the system memory. If the novel attribute bit 450 is configured to specify overwriting of the memory line, the memory controller pads the data by one additional byte (at the end of the data), computes an error correction code for the entire 8 bytes and issues a direct write operation to the 8-byte wide memory line. Similarly, assume the MAC controller issues a 5-byte external bus (write) request to the memory controller that is directed to address 0x100033. If the attribute 450 is configured to specify overwriting of the memory line, the memory controller pads the data by 3 additional bytes (at the beginning of the data) starting at address 0x100030, computes an error correction code for the entire 8 bytes and issues a direct write operation to the 8-byte wide memory line. Although these operations destroy the previous contents of the byte at address 0x100037 (and of the bytes at addresses 0x100030–0x100032) within the packet buffer, the application executing on the processor did not intend to use those bytes anyway, and the bytes cannot be directly used to store bytes from another packet.

Referring again to FIG. 2, a data structure or table, such as a descriptor ring 212, is present in another portion of system memory 210 to instruct the MAC controller 250 as to the address of an available buffer in the packet memory. The descriptor ring includes a plurality of entries 215, each of which includes a pointer 214 (buffer address) and, possibly, a length of the buffer along with an ownership bit 216. The ownership bit 216 is asserted to indicate ownership of the buffer address by either the processor or the controller. The MAC controller typically "walks" the entries 215 of the descriptor ring 212 searching for buffer addresses having the ownership bit that indicates ownership by the controller. Thus, the descriptor ring is used to pass an available buffer address to the controller.

In accordance with an aspect of the present invention, the address loaded into the entry of the descriptor ring having the ownership bit asserted to indicate ownership by the MAC controller is contained within the address range specified in a base address register. The controller thus accesses the descriptor ring to retrieve the address of a buffer at which it may transfer data of a specified length, while the system (memory) controller accesses the base address register to determine the state of the novel attribute. Depending upon that state, the memory controller is instructed to enable or suppress the RMW operation for that external bus request.

Advantageously, the invention improves the efficiency of the node because it enables use of commercially available communication [(MAC)] controllers (MAC controllers) in a manner that reduces the overhead associated with partial write operations to packet memory without having to modify those controllers. For example, the invention allows the communications controller to optimize transfers over the system bus such that a 32-byte data burst is performed over the bus even though only 27 bytes is actually required by the request. Here, the processor provides the communications controller with the address of the allocated buffers within the packet memory utilizing the base address register having the novel attribute configured to indicate no RMW operations. Use of the "no RMW" attribute state in this instance allows the additional 5 bytes of information to be written into the targeted packet buffer locations because the integrity of the data stored at those locations is not at issue. Notably, the attribute is configured by the processor and interpreted only by the system (memory) controller, and thus it does not impact the system beyond the intermediate node processor and its packet memory.

In certain cases, it may desirable to allow a particular memory region (buffer) to be operated on in both modes. Here, the MAC controller may pad out a system bus request to fill a packet buffer with original packet data to thereby avoid a RMW operation. However, the application executing on the processor may require manipulation of a packet header and, thus, not want to destroy any packet data. To accomplish these objectives, the memory can be "dual-mapped" to a virtual address space using two sets of base address registers. Both sets of registers may reference the same memory address, but one set has the novel bit configured in the first state and the other has the novel bit configured in the second state.

For example, assume an entry of the descriptor ring 212 is updated to indicate ownership by the processor. In this case, the descriptor ring is in the same address range as the allocated buffers of the system memory. However, the entry may not be 32 bytes in length and, as such, the RMW operation is required with respect to this entry. Accordingly, the processor provides the actual address of the entry of the descriptor ring to the communications controller utilizing the base address register having the novel attribute configured to enable RMW operations to that address. If the attribute was configured to specify no RMW operation, then a 32-byte write operation to the descriptor ring would destroy entries beyond the particular entry targeted for update, thereby adversely affecting system performance. Thus, the invention enables selective suppression of RMW operations to the system memory.

While there has been shown and described an illustrative embodiment for instructing a memory controller with respect ;to the performance of a write operation directed to a system memory using the novel attribute within a base address register configured to provide mapping of addresses to the memory, it is to be understood that various other adaptations and modifications may be made within the spirit and scope of the invention. For example, the novel attribute may be embodied within other entities such as a memory management unit. In another specific embodiment, the attribute could simply be defined as a high order address bit that is not needed to select locations within the real memory. That is, the attribute may be provided as a high order address bit that is not part of the address decode indicating the mode to be used when writing memory. This latter embodiment must be implemented with care. As a result, the present invention advantageously increases the efficiency of writing packet data to system memory, particularly for small packet sizes.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A computer system that stores packet data comprising:
   a processor;
   a buffer adapted to store the packet data, said buffer defining memory lines, each memory line having a discrete number of bytes;
   a memory address register with which the buffer is addressed at least by the processor; and
   an attribute configured to specify a mode of operation that instructs the processor to pad the packet data to be equal to one or more complete, full memory lines so that the padded packet data are stored only in complete, full memory lines.

2. The computer system as defined in claim 1 wherein the memory address register comprises at least one base address register containing the attribute.

3. The computer system as defined in claim 1 wherein the attribute comprises a high order address bit.

4. The computer system as defined in claim 1 further comprising at least one mask register used in conjunction with buffer address.

5. The computer system as defined in claim 1 further comprising:
   at least one communications controller resident on a communication network arranged to receive and send the packet data; and
   a system bus, connected to the at least one communications controller, by which the received packet data are input to and output from the processor.

6. The computer system as defined in claim 5 further comprising:
   a data structure storing pointers to buffers and ownership indicators that indicate whether the buffers are owned by the processor or at least one communications controller; and
   a direct memory controller accessible by the communications controller to directly store the packet data into the buffer when the buffer is owned by the communications controller.

7. The computer system as defined in claim 1 wherein the memory line comprises a data portion and an error correction code portion.

8. A computer system that receives, stores, and sends packet data to and from communications networks comprising:
   a processor;
   a direct memory controller;
   at least one communications controller resident on a communication network arranged to receive and send packet data;
   a system bus, connected to the at least one communications controller, by which the received packet data are input to the processor and the direct memory controller;
   a buffer adapted to store the packet data, said buffer defining memory lines, each memory line having a discrete number of bytes;
   a memory address register containing a base memory address with which the buffer is addressed at least by the processor and the direct memory controller;
   at least one mask register used in conjunction with the at least one base register to define blocks of memory;
   an attribute that when set directs the processor to pad the packet data to be equal to one or more complete, full memory lines; and
   a data structure storing pointers to buffers and ownership indicators that indicate whether the buffers are owned by the processor or the at least one communications controller;
   wherein the direct memory controller is accessible to the at least one communications controller to directly store the packet data into the buffer when the buffer is owned by the at least one communications controller, and wherein, when so indicated by the attribute, the padded packet data are stored only in complete full memory lines.

9. A process for storing packet data in a computer system comprising the steps of:

receiving the packet data at the computer system;

defining memory lines of a buffer, each memory line having a discrete number of bytes;

addressing the buffer to store the packet data;

indicating to the computer system to store the packet data only in complete memory lines;

padding the packet data to equal one or more complete, full memory lines; and storing the padded packet data in the one or more complete, full memory lines.

10. The process as defined in claim 9 wherein the step of indicating includes providing an attribute that indicates to the computer system to store the packet data only in complete memory lines.

11. The process as defined in claim 10 wherein providing an attribute includes defining a high order address bit as the attribute.

12. The process as defined in claim 10 wherein the step of addressing the buffer includes retrieving at least one base address containing a base address and the attribute.

13. The process as defined in claim 12 further comprising the step of masking the base address to define a block of the buffer.

14. The process as defined in claim 9 further comprising the steps of:

receiving the packet data via at least one communications controller resident on a communication network arranged to receive and send the packet data; and transporting the packet data to and from the computer system.

15. The process as defined in claim 14 further comprising the steps of storing a pointer to the buffer and indicating ownership of the buffer by the processor or the communications controller.

16. The process as defined in claim 9 wherein the step of storing the padded packet data includes calculating an error correction code and storing the error correction code in complete, full memory lines.

17. A computer system for storing packet data comprising:

means for processing the packet data;

means for buffering the packet data in a buffer defining memory lines, each memory line having a discrete number of bytes;

means for addressing the buffer; and means for indicating when the means for processing is to pad the packet data to be equal to one or more complete, full memory lines so that the padded packet data are stored only in complete, full memory lines.

18. The computer system as defined in claim 17 wherein the means for addressing comprises means for addressing at least one base address.

19. The computer system as defined in claim 17 further comprising means for masking the buffer address.

20. The computer system as defined in claim 17 further comprising means for transporting the packet data between a communications network and the computer system by a communications controller.

21. The computer system as defined in claim 20 further comprising:

means for storing a pointer to the buffer and an ownership indicator that indicates whether the buffer is owned by the means for processing or the communications controller; and means for directly storing packets from the communications controller into the buffer when the buffer is owned by the communications controller.

22. Computer readable memory comprising computer executable program instructions for storing packet data in a computer system, the instructions, when executed, causing:

receiving the packet data at the computer system;

defining memory lines of a buffer, each memory line having a discrete number of bytes;

addressing the buffer to store the packet data;

indicating to the computer system to store the packet data only in complete memory lines;

padding the packet data to equal one or more complete, full memory lines; and storing the padded packet data in the one or more complete, full memory lines.

23. The memory as defined in claim 22 wherein the instruction for indicating comprises an instruction for providing an attribute that indicates to the computer system to store the packet data only in complete, full memory lines.

24. The memory as defined in claim 23 wherein the instruction for providing comprises an instruction for defining a high order address bit as the attribute.

25. The memory as defined in claim 23 wherein the instruction for addressing the buffer comprises an instruction for addressing at least one base address containing a base address and the attribute.

26. The memory as defined in claim 22 wherein the instruction for storing the padded packet data comprises instructions for calculating an error correction code and storing the code in complete full memory lines.

* * * * *